April 22, 1969  R. J. J. SIOT  3,439,545
DRIVEN BALANCE WHEEL DEVICE
Filed April 13, 1967  Sheet 1 of 2

INVENTOR
R.J.J. SIOT

BY Glascock, Downing & Seebold
ATTORNEYS

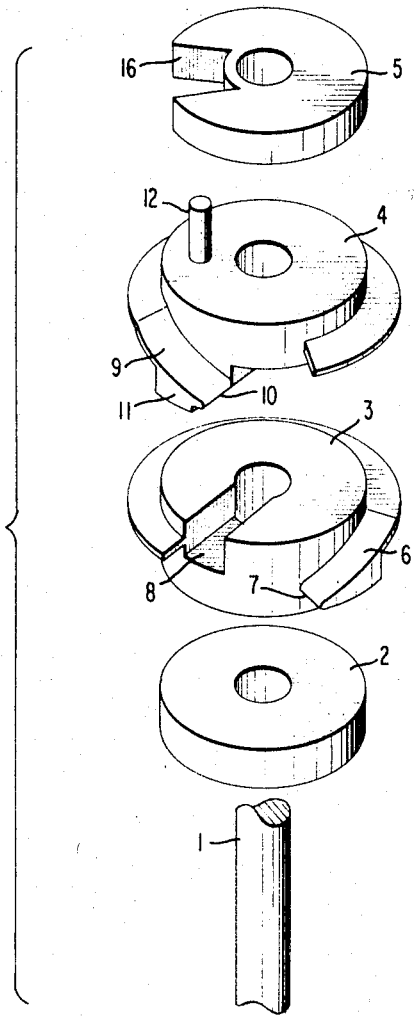
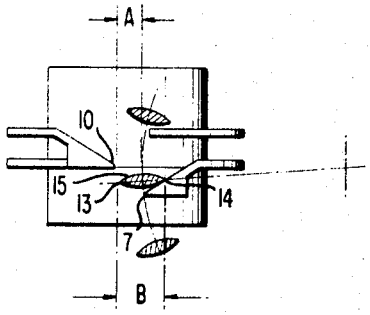
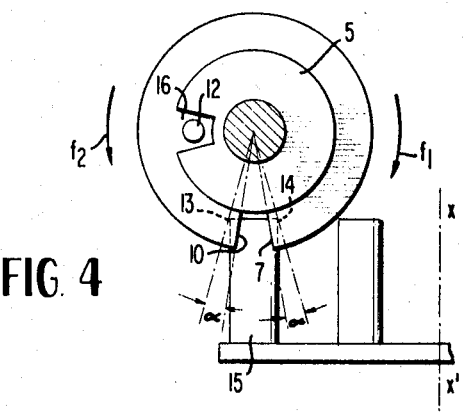

3,439,545
DRIVEN BALANCE WHEEL DEVICE
Roger Jean Jules Siot, Paris, France, assignor to Etablissements Ed. Jaeger S.A., Levallois-Perret, Hauts-de-Seine, France
Filed Apr. 13, 1967, Ser. No. 630,583
Claims priority, application France, Apr. 18, 1966, 57,945
Int. Cl. G04b 15/06
U.S. Cl. 74—1.5                    3 Claims

ABSTRACT OF THE DISCLOSURE

An escapement driven to oscillate at a desired speed is provided with opposed ramps that successively engage teeth on a wheel to be driven by the oscillating escapement. The escapement is provided with a lost motion means between it and the oscillating shaft on which it is mounted in order to avoid the danger of the escapement locking.

---

Figure 1:
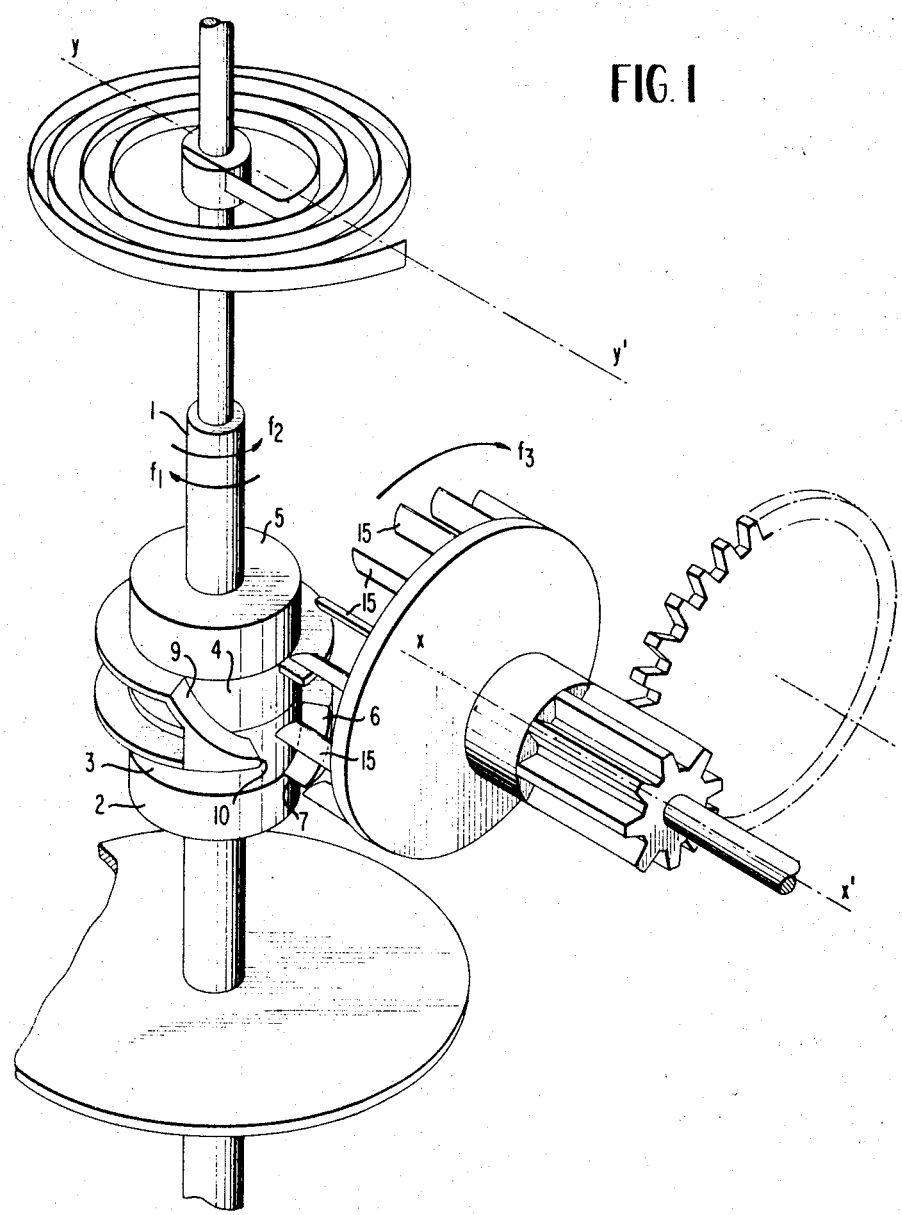

The present invention has as its purpose the improved operation of ramp escapements, at small amplitudes.

At large amplitudes, the displacement either of the receiving pallet or of the discharging pallet is sufficient to cause the escapement wheel to turn a half-step. At small amplitudes, the displacement of the receiving or discharging pallet, depending on the sense of the oscillation, is insufficient, and the pallet leaves the tooth of the escapement wheel at any position. This defect, during the following oscillation, can cause a locking of the extremity of the discharging or receiving pallet on this same tooth of the escapement wheel.

The present invention is illustrated in the attached drawings in which like characters of reference refer to like parts in the several views, and in which:

FIGURE 1 represents a balance provided with the escapement of the invention cooperating with the escapement axis, FIGURE 2 is a view of an escapement of the ramp type showing the position of a tooth of the escapement wheel when the timepiece is at rest, FIGURE 3 is an exploded view of the oscillating escapement showing the improvement of the present invention, and FIGURE 4 is an end view of the device of FIGURE 3 showing the improvement of this invention.

In FIGURE 1 the balance is at its equilibrium position $y-y'$. The axis $y-y'$ is parallel to the axis $x-x'$ of the escapement wheel.

In FIGURE 2 the position of a tooth on the escapement wheel is shown as it is when the balance is at rest. The locking occurs:

(a) On the receiving pallet side, when point 7 of this pallet comes in contact with the extremity 14 of the tooth 15 of the escapement wheel, (b) On the discharging pallet side, when point 10 of this pallet comes in contact with the extremity 13 of this same tooth 15.

To avoid this fault without recourse to the present invention, it would be necessary to make the spacing A between the points 7 and 10 of the pallets 6 and 9 greater than the width B of the tooth 15 of the escapement wheel, so as to obtain a clearance between 7 and 14, on the one hand, and 10 and 13 on the other. This form of embodiment cannot be realized because it would result in two disadvantages:

(1) When the resisting torque transmitted by the wheels is large, the escapement wheel has a tendency to pull back, and if A is greater than B, at each return to the equilibrium point, the pullback of the escapement wheel can cause inopportune shocks;

(2) The fact that A is made greater than B reduces the maximum amplitude of admissible performance prior to the restriking.

FIGURE 3 shows the details in the embodiment of the improved escapement. On the staff of balance wheel 1 is driven a seat 2 on which the pallet unit rests. The pallet unit is preferably formed of two parts: 3 comprising the receiving pallet 6, and 4 the discharge pallet 9. These two parts oscillate or rotate in unison due to the male dog-clutch 11 of part 4 engaging in the female dog-clutch 8 of the part 3. These same two parts are mounted so as to rotate freely on the balance staff 1. The seat 5 which is also driven on the staff of the balance 1 to be positively driven by the staff is provided with an opening 16 designed to provide limited play of the pallet unit on staff 1 upon oscillation of the parts 3 and 4. The pin 12 forming an integral part of part 4 engages the sides of opening 16 alternately as the staff oscillates.

The operating principle of this escapement is shown in FIGURE 4:

At small amplitudes, when the oscillation of the balance wheel is in the direction of the arrow $f_1$, the point 7 of the receiving pallet is able to come into contact with the extremity 14 of the tooth 15 of the escapement wheel. The pullback of the combination of pallets can then take place and be limited by the play alpha ($\alpha$) corresponding to the half-play between the pin 12 and the opening 16. In the following oscillation, in the direction of the arrow $f_2$, the same phenomenon can be reproduced between the point 10 of the discharging pallet and the extremity 13 of the tooth of the escapement wheel. This time the pullback of the pallets can be 2 alpha ($\alpha$).

It will be seen, then, that the reverse torque on the escapement wheel carrying a plurality of teeth 15 cannot cause the problems that arise by making the spacing A equal to B in FIGURE 1, and the problem of having the point 14 lock against point 7 will be removed as at that portion a previous tooth 15 is supported on the surface of pallet 9.

What is claimed is:

1. In a ramp type escapement of the driven balance wheel type having an oscillating balance staff, a cylindrical pallet bearing escapement element mounted on said balance staff carrying opposed pallets and a toothed escapement wheel driving said pallets, a lost motion means between said oscillating balance staff and said escapement element.

2. In a ramp type escapement of claim 1 in which the pallet bearing escapement element is mounted for free rotation on the balance staff and is provided with a pin, a disc element mounted for oscillation with said balance staff, said disc element being provided with an opening loosely receiving said pin, whereby play is provided between said balance staff and said escapement element.

3. In a ramp type escapement of claim 1 in which said pallet bearing escapement element is made in two parts each carrying a pallet, and means securing said two parts together for operation as a unit.

References Cited

UNITED STATES PATENTS 3,137,122   6/1964   Dinrestein et al. _____ 74—1.5
3,267,742   8/1966   Hancock _____ 74—1.5

MILTON KAUFMAN, *Primary Examiner.*

U.S. Cl. X.R.
58—116